//www.google.com/patents/US3059095

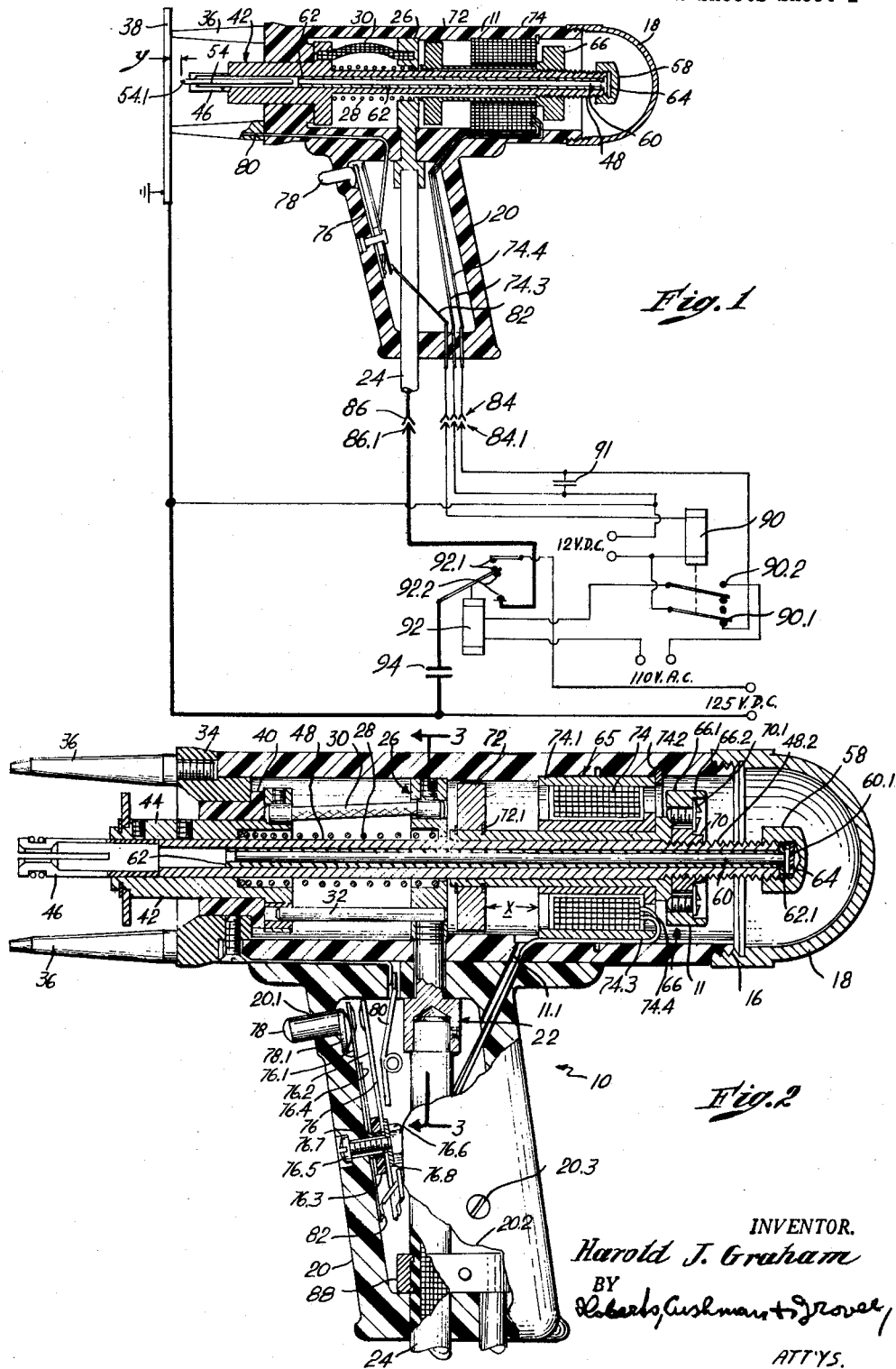

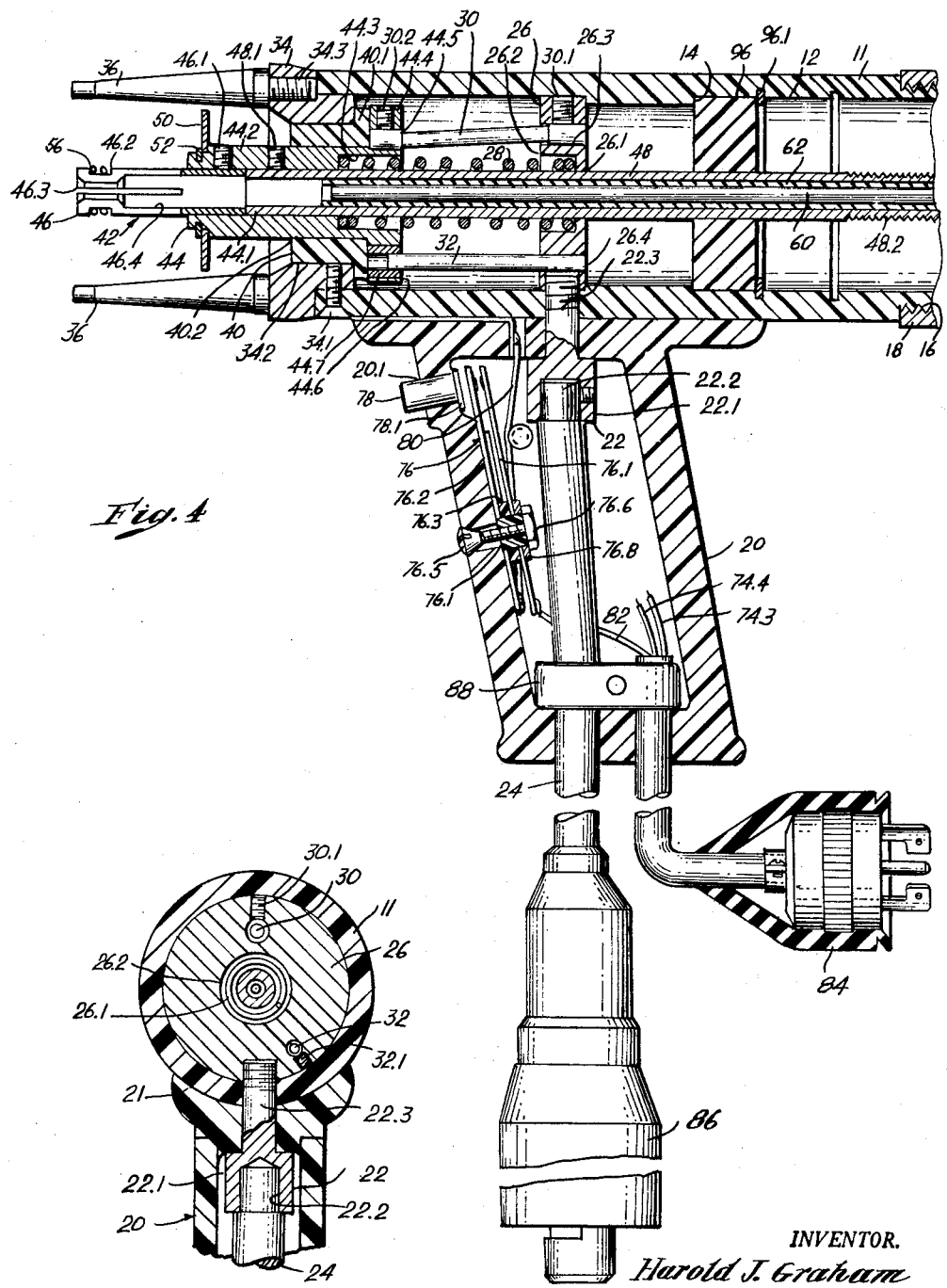

United States Patent Office 3,059,095
Patented Oct. 16, 1962

3,059,095
WELDING APPARATUS
Harold J. Graham, Sharon, Mass., assignor to Omark Industries, Inc., Portland, Oreg., a corporation of Oregon
Filed Nov. 30, 1959, Ser. No. 856,181
9 Claims. (Cl. 219—98)

The field of this invention is that of welding apparatus, and the invention relates more particularly to a novel welding gun to be used for joining a relatively small work-piece to a second work-piece by so-called electrical percussion welding.

In this technique of electrically welding a relatively small work-piece such as a stud, to a second work-piece such as a comparatively thin sheet or plate, several welding processes have proven to be of value in various welding situations. Such processes include that disclosed in my Patent No. 2,685,630, sometimes referred to as an "initial contact" method in which two work-pieces are forced together prior to the application of welding energy across the point of contact of the work-pieces, and that disclosed in my Patent No. 2,518,463 sometimes referred to as an "initial gap" method in which two work-pieces are held in spaced relation as welding voltage is applied thereto whereupon they are moved towards each other and forced together during application of the welding current. In the past, apparatus for carrying out the above-described processes have been designed for use in carrying out mainly one of such processes, and have not been readily adaptable for accommodating a wide range of stud sizes especially with regard to the length thereof.

Objects of this invention are to provide electrical welding apparatus which can be used for carrying out the above-described welding processes without mechanical changes or with only very minor adaptation; to provide such apparatus which is of light, simple, inexpensive, rugged and reliable construction; to provide such apparatus which accommodates a wide variety of stud lengths; and to provide such apparatus which is safe, simple and convenient to operate.

The substance of the present invention can be briefly summarized in one of its main aspects as a welding gun or head comprising an insulating casing provided with means adapted to locate the gun relative to one work-piece such as a plate or sheet; a plunger having means at one end for carrying a second work-piece such as a stud, said plunger being adapted to slide axially within the casing; energy supply means such as a coil spring biasing the plunger to advance such as to extend from the casing making it possible to force the work-pieces together; and means for applying welding energy to the plunger. The apparatus further comprises selectively provided means for holding or latching the plunger in fixed position relative to the casing against the bias as a welding energy source is connected to the work-pieces and for releasing the plunger for advance in response to the biasing force. When these plunger holding means are provided, the work-pieces can be held in initially spaced relation with an initial gap for application of the welding voltage during the advancing movement of the stud, arc formation, and final contacting and joining of the work-pieces; when the plunger holding means are omitted the work-pieces can be initially contacted and current can thereafter be applied across the point of contact for the formation of an arc and a gap between the work-pieces and the final forcing together of the work-pieces by the biasing force.

In a preferred embodiment of this invention, the plunger holding means comprise an insulating sleeve adapted to fit around the plunger and adapted to be secured detachably and adjustably to the plunger, the sleeve having a flange portion at one end and armature means at the other end. An electromagnet means is slidably mounted upon the sleeve between the sleeve flange and the armature means and is adapted to be secured detachably to the welding gun casing. In this embodiment, means are provided for energizing the electromagnet means to attract the armature in a direction opposite the direction of the plunger bias to hold the sleeve armature and therefore the welding gun plunger, against the plunger bias as the welding energy source is connected to the work-pieces and for thereafter de-energizing the electromagnet means for releasing the armature and plunger for advance in response to the plunger bias. The plunger holding means can be conveniently adjusted, by changing the location of the above-mentioned sleeve on the plunger shaft, for adapting the apparatus to hold work-pieces in any desired initially spaced relation. These holding means are of simple design and can be readily attached to or removed from the apparatus.

In another aspect of the invention, a preferred embodiment has a plunger comprising an assembly which includes a detachable split-sleeve or collet and a hollow plunger shaft. A plurality of stop rods of different lengths are selectively provided and are adapted to be secured detachably within the plunger shaft and to be insulated from the plunger for determining the length of stud or small work-piece which can be carried by the collet.

Other objects, inventive aspects, advantages, and details of construction will appear from the following description of a typical practical embodiment illustrating the novel characteristics of the invention.

The description refers to drawings in which

FIG. 1 is a diagrammatic view of the apparatus provided by this invention including the electrical means for actuating the apparatus when the holding means are selectively provided;

FIG. 2 is a section view along the axis of the novel welding gun provided by this invention showing the holding means attached;

FIG. 3 is a section view along line 3—3 of FIG. 2; and

FIG. 4 is a section view similar to FIG. 2 showing the construction when the holding means are selectively omitted.

Referring to the drawings, FIGS. 2, 3 and 4, 10 indicates a welding gun having a casing 11, preferably of hollow, cylindrical shape, made of electrically non-conductive and heat-resistant material such as a thermosetting plastic. The casing has a recess or bore 12 of larger diameter at one end forming a shoulder 14 for a purpose to be described below, and, at the same end, has external screw threads 16 for mounting a correspondingly threaded, dome-shaped cap 18. Although the cap is shown mounted upon the casing by means of screw threads, any suitable means for detachably mounting the cap are within the scope of this invention.

The casing has a handle 20, preferably of the same material as the casing, which has an arcuate surface 21 adapted to match the external casing curvature and which is attached to the casing by the stud 22. The stud 22 has an enlarged head 22.1 recessed at 22.2 to receive an electrical conductor 24 for applying welding current to the apparatus, and has a screw threaded end 22.3 threadedly engaging a conductor member 26 within the casing. The stud 22 thus serves to mount the handle 20 upon the casing 11, to locate the conductor member 26 at a central location within the casing, and to conduct welding current from a source outside the casing to the conductor member 26. The handle has cover pieces 20.2 secured thereto by a screw 20.3.

The conductor member 26 has a central bearing bore 26.1 counterbored as at 26.2 to receive one end of the helical coil compression spring 28, and has a bore 26.3, in which the flexible conductor or pigtail 30 is mounted by means of the set screw 30.1, and a bore 26.4, in which the guide pin 32 is mounted by means of the set screw 32.1. See FIG. 3.

The casing also has an electrically conductive stand bushing 34 secured thereto at the end opposite the cap 18 by means of the screws 34.1 (only one of which is shown), the stand bushing having a central bore 34.2 and at least three threaded bores 34.3 equally spaced around the central bore. Correspondingly threaded aligning legs 36 are mounted in each of the threaded bores of the stand bushing, and, as shown in FIG. 1, provide a stand or frame adapted to engage a work-piece, indicated at 38, for locating the casing 11 relative to the work-piece. That is, engagement of the aligning legs with the work-piece 38 spaces the casing relative to the work-piece and also aligns the casing axis perpendicular to the engaged surface of the work-piece.

A slide bushing 40 having a flange portion 40.1 and a central bearing bore 40.2 is, in turn, secured within the bore 34.2 in the stand bushing so that the bearing bore 40.2 is aligned with the bearing bore 26.1 in the conductor member 26. The slide bushing is made of electrically non-conductive and heat-resistant material, preferably Teflon, which is adapted to provide a low friction bearing surface within the bearing bore 40.2. The slide bushing is secured in position by any suitable means such as by cementing so that the flange portion 40.1 thereof, which aids in securing the bushing, is located as shown for a purpose to be explained below.

A plunger 42 is arranged within the casing for sliding axial movement in the slide bushing bore 40.2 and in the bearing bore 26.1 in the conductor member. The plunger comprises a plunger bushing 44 having a central bore 44.1 in which the split-sleeve 46 is secured by the set screw 46.1 and in which the tubular plunger shaft 48 is secured by the set screw 48.1.

The plunger bushing has a slide surface 44.2 adapted to move freely within the slide bushing bore 40.2, and the plunger bushing bore 44.1 is counterbored as at 44.3 to receive the other end of the coil spring 28, whereby the plunger is biased, to the left as shown in FIG. 2, to extend the split-sleeve 46 axially from the casing. The plunger bushing also has a flange portion 44.4 adapted to engage the corresponding flange portion 40.1 of the slide bushing for limiting movement of the plunger in response to the bias of the spring 28. The flange portion of the plunger bushing has a bore 44.5, in which the flexible pigtail 30 is secured by a set screw 30.2, and a bore 44.6, preferably containing a bearing 44.7 made of heat-resistant and electrically insulating material such as Teflon, in which the guide pin 32 is slidingly received. In this construction, it can be seen that the plunger is adapted for sliding axial or telescoping movement within the casing and yet can be positively connected to a source of welding current through the flexible pigtail 30 and the conductor member 26. The plunger bushing is also adapted to slide on the guide pin 32 so that the plunger will not rotate within the casing, and is fully insulated from the aligning legs 36 by the slide bushing 40 and the slide bushing flange 40.1. In the preferred embodiment of this invention, the plunger bushing carries an insulating disc or washer 50 which is secured thereto by a retaining ring 52, the washer serving as a bumper to assure that the plunger bushing does not inadvertently make electrical contact with structure in the welding area.

The split-sleeve or collet 46 carried by the plunger is adapted to receive, hold and grip a second work-piece 54 inserted therein, see FIG. 1, the sleeve being constricted by rubber O-rings 56 of conventional design which are fitted in a groove 46.2 on the sleeve. The sleeve is adapted to grip said work-piece with sufficient force so that firm electrical contact will be made between the sleeve and the work-piece, whereby the work-piece is effectively connected to the source of welding current. For this purpose, the sleeve preferably has a small-bore portion 46.3 in which the work-piece is gripped and a large bore portion 46.4 which is not intended to contact the work-piece. This construction provides a sleeve of substantial flexibility so that some variety of work-piece sizes can be accommodated by the sleeve while providing adequate force for gripping the particular work-piece inserted therein. Although the sleeve illustrated here is adapted to receive a cylindrical or stud-shaped work-piece 54, it should be understood that sleeves can be provided which are adapted to receive studs of square or other cross-section.

The tubular plunger shaft 48 which extends from the plunger bushing through the bore 26.1 has external screw threads 48.2 at its distal end which are engaged with a correspondingly threaded cap 58. A stop rod 60 having a head 60.1 is secured within the shaft by the cap 58, and preferably an insulating tube 62 having the flange 62.1 and an insulating disc 64 are provided for insulating the rod from the shaft 48 and from the shaft cap respectively. As thus constructed, stop rods of various lengths can be selectively installed within the plunger shaft for limiting the extent to which a work-piece can be inserted within the split sleeve 46.

Electromagnet holding means 65 are also selectively provided within the casing for controlling movement of the plunger 42 in response to bias of the spring 28. These means comprise an insulating sleeve 66 which is adapted to fit over the plunger shaft 48. The sleeve has an enlarged, externally-knurled head 66.1 suitably bored as at 66.2 to receive a nut 70 which is retained in the bore by screws 70.1. The sleeve can be rotated relative to the plunger shaft which is not rotatable, so that the nut 70 threadedly engages the screw threads 48.2 on the plunger shaft, thereby to secure the sleeve at any desired location on the shaft. An armature 72 is secured to the sleeve oppositely to the sleeve head by retaining rings 72.1, and an electromagnet coil 74 suitably mounted in and insulated from the core 74.1 is slidingly mounted on the sleeve between the sleeve head and armature. The sleeve 66 insulates the magnet core and armature from the plunger shaft 48. The electromagnet core is of suitable diameter to fit closely within the casing recess 12 against the shoulder 14 and is detachably held in said position by the retaining ring 74.2. Leads 74.3 and 74.4 are detachably connected to and extend from the magnet coil through casing slot 11.1 and through the handle 20.

Switch means 76 for actuating the welding gun 10 are disposed within the casing handle. The switch means comprise first and second contact members 76.1 and 76.2 respectively, which are normally separated by an insulating block 76.3 and which are biased for such separation by the flat spring 76.4. The switch members are held in the described relation by the bolt and nut 76.5 and 76.6 which are insulated from the contact members by the bushing 76.7 and the washer 76.8 respectively, and which also serve to mount the switch means on the casing handle. A switch trigger button 78 having the enlarged retaining head 78.1 is fitted within an aperture 20.1 in the handle, and is arranged so that when the button is pressed the contact members 76.1 and 76.2 are forced together against the bias of the spring 76.4. A ground strap 80 connects the contact arm 76.2 to the aligning legs 36 through a screw 22.1, and a leg 82 extends from the contact arm 76.1.

The electromagnet leads 74.3 and 74.4, the switch lead 82, and the welding current lead 24, each suitably insulated, are led from the welding gun through the base of the gun handle, and preferably the leads are provided with collars 88 which are adapted to grip the leads without injuring the lead insulation to absorb any stresses placed upon the leads. Preferably, but not necessarily, the leads 74.3, 74.4 and 82 terminate in a jack 84, and the lead 24 terminates in a jack 86.

When the electromagnet means 65 are selectively provided in the welding gun 10, the gun is connected in an electrical circuit as shown in FIG. 1 in a manner which will now be described. In FIG. 1, voltage sources are indicated by appropriately marked terminals in conventional manner but it should be understood that the voltages indicated have been selected for the purpose of illustration and are not intended to limit the scope of this invention in any way. It should also be understood that a master switch or switches, not shown, may be provided for controlling the various illustrated voltage sources.

As illustrated, when the jack 84 is connected to the plug 84.1, the electromagnet lead 74.3 is connected to one side of a 12 volt D.-C. source, and the lead 74.4 is connected, through the normally closed contacts 90.1 of a relay 90, to the other side of the 12 volt D.-C. source, thereby energizing the electromagnet coil 74. A delaying condenser 91 is also connected in parallel with the electromagnet coil 74 for a purpose to be described below. The lead 82 is also connected through the relay 90 to one side of the 12 volt D.-C. source and is adapted to be connected through the switch 76, the strap 80, the aligning legs 36, the grounded work-piece 38 to the other side of the 12 volt D.-C. source for energizing the relay 90. The relay 90 is also provided with normally open contacts 90.2 through which a second relay 92 is adapted to be energized from a 110 volt A.-C. source.

A main welding capacitor 94 is normally connected to a 125 volt D.-C. source through normally closed contacts 92.1 of the relay 92, whereby the capacitor is charged in conventional manner. The relay 92 is also provided with normally open contacts 92.2 through which the capacitor is adapted to be discharged when the welding current jack 86 is connected to the plug 86.1.

Operation of the apparatus provided by this invention will now be described.

When it is desired to join two work-pieces, such as a stud 54 and a plate 38 (FIG. 1), by the above-mentioned initial gap method, the welding gun 10 is selectively provided with the electromagnet holding means 65. This is conveniently accomplished by removing the cap 18 from the gun casing and by rotating the sleeve 66 into threaded engagement with the plunger shaft 48. The electromagnet core 74.1 is then secured in position against the casing shoulder 14 by the retaining ring 74.2. It can be seen that by adjustment of the position of the sleeve 66 on the shaft 48, the armature 72 can be set at any desired distance, $x$ in FIG. 2, from the electromagnet core. The jacks 84 and 86 are then connected to their respective plugs thereby energizing the electromagnet coil 74, through the normally closed switch 90.1 of the relay 90 which is de-energized at that time.

The smaller or stud-shaped work-piece 54 is now inserted within the sleeve 46 until it engages the stop rod 60. The plunger 42 is then pushed axially within the casing until the armature 72 contacts the core 74.1 of the energized electromagnet. The electromagnet attracts and holds the armature in a direction oppositely of the plunger bias, whereby the plunger is held against the bias of the spring 28 as shown in FIG. 1.

The welding gun spacing and aligning legs 36 are now engaged with the work-piece such as plate 38 as shown in FIG. 1 so that the work-piece such as the stud 54 is held in spaced relation from the work-piece 38. In this regard it should be remembered that the critical space $y$ (FIG. 1) between the work-pieces is readily adjustable by means of the sleeve 66 and nut 70 and by interchanging stop rods 60 of different lengths.

The button 78 is now pressed, closing the switch 76 for energizing the relay 90. As the relay is energized, the contacts 90.1 open for disconnecting the electromagnet coil from its voltage source, and the contacts 90.2 close for energizing the relay 92. Energization of the relay 92 opens contacts 92.1 disconnecting the capacitor 94 from its source of charging voltage and closes contacts 92.2 for applying welding energy stored in the capacitor through the conductor 24 to the work-piece 54. After welding current is applied to the work-piece 54, the electromagnet means remains energized for a short time, until the delay capacitor 91 has been discharged through the electromagnet coil, and then is automatically de-energized releasing the plunger 42 for movement in response to the bias of spring 28. The plunger 42 then moves toward the work-piece 38 forcing the work-pieces 38 and 54 together. As the gap between the work-pieces closes, a welding arc is formed which melts adjacent portions of the work-pieces. Thereafter welding current continues to flow through the work-pieces as the welded portions thereof are forced together until the capacitor 94 is fully discharged. The button 78 can then be released for de-energizing the relays 90 and 92, thereby returning the welding capacitor 94 to charging position and re-energizing the electromagnet means 65. The welding gun can now be removed from the work-pieces and is ready to perform another welding cycle.

The delay in de-energizing of the electromagnet imparted by the delaying capacitors 91 assures that welding current is applied to the work-piece 54 before the plunger 42 is released for forcing the work-pieces together. It should also be noted that insulation of the stop rod 60 afforded by the insulating tube and disc, 62 and 64 respectively, prevents application of welding current to the work-piece 54 through the stop rod 60 in any situation where the collet 46 does not make adequate electrical contact with the work-piece 54. Such a situation might arise if the collet were fouled with dirt or other extraneous materials, and, if the stop rod were not insulated from the plunger, might permit formation of an arc between the rod 60 and the work-piece 54. It can be seen that this could jam the welding gun to such an extent as to require replacement of the gun plunger 42.

When it is desired to weld work-pieces such as the plate 38 and the stud 54 by the above-mentioned initial contact method, the electromagnet means 65 can be conveniently removed from the welding gun in the manner above-described, thereby providing a light and convenient apparatus for carrying out the process. If desired, an additional bearing member 96 can be secured within the casing by the retaining ring 96.1 in place of the electromagnet holding means 65 as shown in FIG. 4.

In this application of the welding apparatus, the work-piece or stud 54 can be inserted within the sleeve 46 as above described until the work-piece contacts the stop rod 60. Of course the stop rod can be interchanged with stop rods of different lengths as above described, so that various lengths of stud can be accommodated within the sleeve. The welding gun is then contacted with the work-piece 38 in the same manner as shown in FIG. 1 so that the aligning legs 36 hold the gun axis perpendicular to the contacted face of the work-piece. In this position, the work-pieces 38 and 54 will be forced together by the bias of the plunger spring 28.

The button 78 can then be pressed for closing the switch 76 to energize the relays 90 and 92 as above described, thereby to discharge the welding capacitor 94 across the point of contact of the work-pieces. This forms a welding arc between the work-pieces generally speaking because of the uneven nature of the contacting work-piece surfaces, preferably provided by a readily ionizable tip 54.1 as shown in FIG. 1. As the welding arc is formed, adjacent portions of the work-pieces are melted, and, as the bias of the spring 28 continues to force the work-pieces towards each other and the distancing metal is suddenly dissipated, the melted portions of the work-pieces will be percussively fused. Thereafter, when the welding capacitor is fully discharged, the button 78 can be released for de-energizing the relays as above-described, and the gun can be removed from the work-pieces ready to perform another welding operation.

It should be understood that although a particular embodiment of the apparatus provided by this invention has been described for the purpose of illustration, this invention includes all modifications and equivalents thereof which fall within the scope of the appended claims.

I claim:

1. A plunger control device for stud welding apparatus, having a casing and a biased plunger adapted to slide within the casing, adapted for electromagnetically holding the plunger in fixed position relative to the casing against the bias and for releasing the plunger for movement on application of a welding voltage, said control device comprising:

a casing sleeve removably fastened to said casing;

a plunger sleeve removably fastened to said plunger; and an electromagnetic coil component and an armature component, one of said components being removably fastened to said casing sleeve and the other component surrounding and being removably fastened to said plunger sleeve, such that relative movement of said coil and armature components is guided by the sleeves and sliding of the plunger within the casing is unimpeded by removal of said components;

whereby two work-pieces can be initially disposed in spaced relation and thereafter be moved together upon deenergization of the coil component during application of welding energy and whereby, when the coil and armature components are ineffective, the work-pieces can be initially forced together and welding energy applied thereafter.

2. Device according to claim 1 wherein said armature component is disc shaped, transversely extending from said plunger sleeve outwardly towards the inside of said casing sleeve facing said coil component.

3. Apparatus for welding two work-pieces together comprising:

a casing having means adapted to engage one of said work-pieces for locating the casing relative to said work-piece;

a plunger shaft having means at one end for holding the other of said work-pieces, said plunger shaft being adapted to slide axially within the casing;

a sleeve adjustably secured to said plunger shaft and having a flange at one end;

means biasing the plunger to extend axially from the casing for forcing said work-pieces together;

means for applying welding voltage to the plunger;

an electromagnet secured to the inside surface of the casing in surrounding relation to the plunger axis;

a disc-shaped armature slidingly arranged within said inside surface of the casing, transversely facing an end of said electromagnet, and secured to said sleeve at the end opposite to said flange so as to be attracted by the electromagnet in a direction oppositely of the plunger bias, said electromagnet being slidingly disposed around the sleeve between the sleeve flange and the armature; and control means for energizing the electromagnet to hold the armature and plunger against said bias as welding voltage is applied, thereby to hold said work-pieces in spaced relation, and for thereafter deenergizing the electromagnet automatically to permit movement of the armature and plunger in response to said bias during application of the welding voltage, thereby to force said work-pieces together;

whereby by adjustment of the sleeve on the plunger, the work-pieces can be held in predetermined spaced relation as welding voltage is applied and can thereafter be forced together automatically during application of the welding voltage.

4. Apparatus according to claim 3, wherein the plunger includes a hollow shaft having sleeve means at one end adapted to receive and grip said other work-piece when inserted therein, and wherein a plurality of stop rods of different length are selectively provided, each of said stop rods being adapted to be secured detachably within and to be insulated from the plunger shaft for limiting the extent to which said other work-piece can be inserted within said sleeve means.

5. Apparatus for welding two work-pieces together comprising:

a casing having means at one end adapted to engage one of said work-pieces for locating the casing relative to said work-piece;

a plunger having means at one end for holding the other of said work-pieces, said plunger being mounted for sliding, axial movement within the casing;

means biasing the plunger to extend axially from the casing for forcing said work-pieces together;

means for applying welding voltage to the plunger;

and means selectively provided for controlling movement of the plunger in response to said bias, said control means including an insulating sleeve having a flange portion at one end and an armature secured at its other end, said sleeve being detachably and adjustably secured on the plunger, an electromagnet coil slidingly mounted on the sleeve between the sleeve flange and armature, said coil being detachably secured within the casing, and means for energizing the coil to hold the armature against the plunger bias as welding voltage is applied and for thereafter deenergizing the coil automatically during application of the welding voltage for permitting movement of the armature and plunger in response to said bias;

whereby, when said control means are provided, the work-pieces can be initially disposed in predetermined spaced relation as welding energy is applied and can thereafter be forced together automatically during application of the welding energy and whereby, when said control means are omitted, the work-pieces can be initially forced together and welding energy can thereafter be applied.

6. Apparatus for welding two work-pieces together comprising:

a casing having means adapted to contact one of said work-pieces for locating the casing relative to said work-piece;

a plunger member including a tubular shaft having a one end means for gripping stud-shaped work-pieces when inserted therein and at the other end a closing cap, said plunger member being mounted within the casing for sliding axial movement;

biasing means adapted to move said plunger axially from the shaft for forcing the work-pieces together; and a stop rod having at one end holding means adapted to secure the rod detachably to said cap wholly within and insulated from the plunger shaft for limiting the extent to which a stud-shaped work-piece can be inserted into said gripping means;

whereby said stop rod can be selected from a plurality of rods of different lengths corresponding to the lengths of stud-shaped work-pieces for insertion.

7. For stud welding apparatus having a biased plunger electromagnetically controlled within a housing, a coil and armature assembly within the housing and surrounding the plunger, comprising:

first sleeve means being fastened to said plunger at one end and carrying said armature secured to its other end; and second sleeve means secured to said housing, slidingly associated with the outside of said first sleeve means, and carrying said coil facing said armature;

whereby the armature and the plunger can move relatively to each other with the first sleeve means sliding within the second sleeve means, and operation of the plunger is unimpeded by removal of the sleeve means.

8. In apparatus for welding a stud to a second workpiece with electromagnetic control of the stud by a coil fixed to a housing for attracting an armature associated with the stud, a device for associating the coil and the armature with the housing and the stud, comprising:

a hollow plunger open at one end for receiving a stud and having closing means at the other end such that a distancing piece can be completely inserted between stud and closing means;

first sleeve means fastened to said plunger at one end and carrying said armature secured to its other end; and second sleeve means secured to said housing, slidingly associated with the outside of said first sleeve means, and carrying said coil facing said armature;

whereby the armature and the plunger can move relatively to each other with the first sleeve means sliding within the second sleeve means, and the plunger can be adapted for accommodating studs of different length by confining therein correspondingly different distancing pieces.

9. In apparatus for welding two work-pieces together by moving studs relatively to a housing with a biasing force, a stud moving device accommodating studs of different lengths, comprising:

a hollow plunger slidingly arranged within the housing;

at one end of said plunger means for holding a stud with its outer end projecting from the housing means and with its inner end communicating with the hollow region of the plunger;

at the other end of said plunger means for completely closing its hollow region; and between said stud holding means and said closing means a stop rod for locating a stud relatively to the plunger;

whereby studs of different length and of different projection of their outer ends can be accommodated by the selective use of stop rods of suitable lengths.

References Cited in the file of this patent

UNITED STATES PATENTS

| | | |
|---|---|---|
| 2,712,049 | Aversten | June 28, 1955 |
| 2,745,933 | Puckett | May 15, 1956 |
| 2,903,563 | Ettema et al. | Sept. 8, 1959 |
| 2,938,105 | Kelemen et al. | May 24, 1960 |